United States Patent [19]

Watt

[11] 3,816,278

[45]*June 11, 1974

[54] PHOTOPOLYMERIZABLE EPOXY SYSTEMS CONTAINING NITRILE GELATION INHIBITORS

[75] Inventor: William R. Watt, Princeton Junction, N.J.

[73] Assignee: American Can Company, Greenwich, Conn.

[ * ] Notice: The portion of the term of this patent subsequent to Mar. 20, 1990, has been disclaimed.

[22] Filed: Dec. 13, 1972

[21] Appl. No.: 314,613

Related U.S. Application Data

[63] Continuation-in-part of Ser. No. 144,667, May 18, 1971, Pat. No. 3,721,616.

[52] U.S. Cl.............. 204/159.11, 96/75, 96/91 R, 96/115 P, 117/93.31, 117/132 BE, 117/155 R, 260/2 A, 260/2 EP, 260/47 EP, 260/47 UP, 260/783, 260/88.3 R, 260/91.1 A, 260/91.1 M, 260/91.5, 260/93.5 R, 260/94.9 GA, 260/343.6, 260/343.9, 260/348 C, 260/348 R, 260/830 TW, 260/836, 260/837 R, 260/837 PV, 204/159.14, 204/159.15, 204/159.18, 204/159.22, 204/159.24

[51] Int. Cl.............................. B01j 1/10, B01j 1/12

[58] Field of Search...... 96/115 D, 115 R, 75, 91 R; 204/159.11, 159.14, 159.22, 159.23

[56] References Cited

UNITED STATES PATENTS 3,721,616   3/1973   Watt .............................. 204/159.11

*Primary Examiner*—Murray Tillman
*Assistant Examiner*—Richard B. Turer
*Attorney, Agent, or Firm*—Robert P. Auber; Ernestine G. Bartlett; Harries A. Mumma, Jr.

[57] ABSTRACT

Polymerization of epoxides and mixtures of epoxides with lactones and vinyl compounds, polymerizable through the action of cationic catalysts, is controlled in compositions essentially free of volatile solvents by providing in such compositions, in association with a radiation-sensitive catalyst precursor, a gelation inhibitor in the form of a nitrile compound such as acetonitrile present in small amounts up to several percent by weight.

32 Claims, No Drawings

PHOTOPOLYMERIZABLE EPOXY SYSTEMS CONTAINING NITRILE GELATION INHIBITORS

CROSS-REFERENCE TO RELATED APPLICATIONS

This application is a continuation-in-part application of U.S. application Ser. No. 144,667 filed May 18, 1971 now U.S. Pat. No. 3,721,676 issued Mar. 20, 1973.

BACKGROUND OF THE INVENTION

When a flowable liquid composition is applied to a substrate to form a coating or decoration, or to provide graphic or other information, it may be advantageous shortly after application to obtain rapid hardening, gelling, or curing of the coated material by irradiation for a brief perid of time. This is particularly advantageous if the liquid coating composition is substantially free of volatile solvents which do not themselves participate in the curing, since the hardening then may be effected very rapidly without interferences from evolving vapors and without producing waste gases. Practical coating systems of these types have been developed, utilizing photosensitive latent curing catalysts which respond to irradiation by releasing the catalytic agent.

One such coating system utilized epoxide compounds, or an epoxide material blended from a number of epoxide compounds, individually having relatively low molecular weights, which may be formulated to provide good flow characteristics with or without the use of inert solvents. Cationic polymerization catalysts cause the epoxy ring to open through cleavage of a carbon-oxygen bond, forming a cationic reactive intermediate. The reaction thus initiated may repeat itself rapidly many times in a chain reaction to form a polymer of repeating ether units. Gelling time for such photosensitive catalytic polymerization may be short enough to provide a substantially hardened coating a short distance after irradiation is carried out while the substrate passes at high speed along a treatment line.

The advantages of such radiation-responsive catalytic polymerization are made apparent by comparison with other available systems. Polymerization and cross-linking of epoxide compounds have been carried out by a variety of methods; see, for example, Chapter 5 of "Handbook of Epoxy Resins" by H. Lee and K. Neville, McGraw-Hill Book Company, 1967. A disadvantage of many of the so-called curing reactions is that they begin immediately on mixing reactants. Many of the curing techniques are based on two-component systems in which the two components must be isolated from each other until the curing reaction is to take place. Thus, only that quantity of material is mixed which can be used at once. Many of the curing reactions are slow and are unsuitable for applications which require a rapid transformation from the liquid or thermoplastic state to the solid state. Heat is frequently applied to stimulate or expedite reactions, but this is especially undesirable in applications where the epoxide material is in contact with a heat-sensitive material or where the reduction in viscosity on heating would cause "run-off" of the resin before curing takes place. Careful attention must be given to staying within the temperature limitations of the system involved. In order to prevent harmful effects of thermal curing, it is often necessary to extend the curing cycle an unreasonable length of time.

There are disclosed in U.S. Pat. No. 3,025,157 compositions containing a liquid epoxide resin made up, for example, largely of the diglycidyl ether of bisphenol A, mixed with about 6 percent by weight of an aryl diazonium fluoroborate such as benzenediazonium tetrafluoroborate, which is a photosensitive compound supplied dissolved in a solvent (acetone). The composition is applied to a surface and subjected to ultraviolet radiation to effect curing of the epoxide.

In a copending application for U.S. Patent Ser. No. 753,869, filed Aug. 20, 1968 now U.S. Pat. No. 3,708,296 issued Jan. 2, 1973, and assigned to the same assignee as is the present application, there are disclosed and claimed compositions comprising epoxide materials along with photosensitive compounds of a type having superior properties as radiation-sensitive latent catalysts for the polymerization of epoxides. Some of the compositions disclosed in that application consist simply of a liquid epoxide material containing the improved latent catalyst, while other compositions contain also about 35 percent or more of a solvent for the epoxide such as chlorobenzene, toluene, and methyl ethyl ketone. Many of the compositions disclosed in that application contain large proportions of a solvent media made up in part of acetonitrile or butyronitrile. Thus the nitrile may make up about 15 to 55 percent of the total weight of a composition containing some 60 to 90 percent of a solvent medium comprising the nitrile and toluene, o-chlorotoluene, methyl ethyl ketone, or chlorobenzene.

However, epoxide and related compositions containing photosensitive catalyst precursors have a tendency to gel upon standing, even in the absence of light or ultra-violet radiation. This tendency to undergo premature reaction is particularly troublesome in the case of formulations of the solventless type which are effectively free of unreactive liquid diluents or solvents. Thus the problem of inconveniently short shelf or pot life may limit rather drastically the utility of polymerizable compositions essentially free of volatile solvents, which for practical purposes may be defined as compositions containing less than about 4 percent by weight of solvents boiling below about 190°C. Such solvents include toluene, chlorobenzene, chlorotoluene, and acetonitrile. The polymerization reaction is exothermal and, where large masses are involved, can generate sufficient heat to cause combustion of the epoxide resins.

SUMMARY OF THE INVENTION

Accordingly, new and improved stabilized polymerizable compositions comprising epoxides and epoxides in admixture with monomers selected from the group consisting of lactones and vinyl-containing compounds are provided containing radiation-sensitive catalyst precursors and also gelation inhibitors which, upon admixture with the polymerizable material, inhibit gelation of the reactive composition prior to irradiation. This is accomplished by the inclusion of a small quantity of one or more nitrile compounds as gelation inhibitors. In these compositions, the total amount of nitriles and of any unpolymerizable volatile solvents together is less than about 4% by weight of the composition. Such compositions may have greatly extended storage or pot life, premature reaction in the dark or at minimal levels of radiation being inhibited so that the mixtures may be retained for periods of days or more before application. Thus, in accordance with the process of the invention, an essentially solventless mixture first is formed of the polymerizable material, a Lewis acid catalyst precursor, and the nitrile inhibitor. The resulting mixture, at a convenient time subsequently, is subjected to application of energy, such as actinic or electron beam irradiation, to release the Lewis acid catalyst in sufficient amounts to inhitiate the desired polymerizatin reaction.

DETAILED DESCRIPTION

Any monomeric or prepolymeric material, or mixture of such materials, of suitable viscosity, which is polymerizable to higher molecular weights through the action of a cationic catalyst, may be utilized in the process and compositions of the present invention. In a preferred embodiment, any polymerizable, monomeric or prepolymeric epoxide material or mixture of such epoxide materials, of suitable viscosity when free of unpolymerizable solvents, may be utilized. The classic epoxy resin is obtained by the well known reaction of epichlorohydrin and bisphenol A (4,4'-isopropylidenediphenol). The reaction product is believed to have the form of a polyglycidyl ether of bisphenol A (the glycidyl group being more formally referred to as the 2,3-epoxypropyl group) and thus may be thought of as a polyether derived from the diphenol and glycidol (2,3-epoxy-1-propanol). The structure usually assigned to the resinous product is

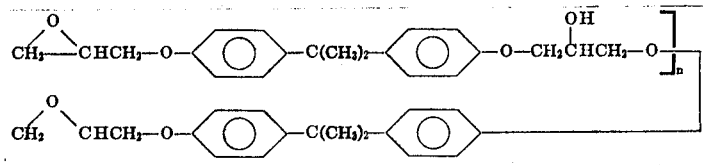

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A ($n=0$), which may be named 2,2-bis[p-(2,3-epoxypropxy)phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be crosslinked or otherwise polymerized in accordance with the invention, whereby cleavage of the terminal epoxy or oxirane rings is initiated by the action of the Lewis acid halide released when energy is applied to the latent polymerization catalyst.

Many other epoxide materials are available in polymerizable monomeric or prepolymeric forms. Among these are 1,2-epoxycyclohexane (cyclohexene oxide, also named 7-oxabicyclo[4.1.0]heptane); and vinylcyclohexene dioxide, more specifically named 3-(epoxyethyl)-7-oxabicyclo[4.1.0]heptane or 1,2-epoxy-4-(epoxyethyl)cyclohexane. Ethylene oxide (oxirane,

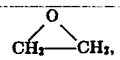

the simplest epoxy ring) and its homologues generally, e.g., propylene oxide (1,2-epoxypropane) and 2,3-epoxybutane, are themselves useful; other useful epoxidic cyclic ethers are the C₃O ring compound trimethylene oxide (oxetane), derivatives thereof such as 3,3-bis(chloromethyl)-oxetane (also named 2,2-bis(chloromethyl)-1,3-epoxypropane), and the C₄O ring compound tetrahydrofuran, as examples. Other epoxidized cycloalkenes may be used, a readily available polycyclic diepoxide being dicyclopentadiene dioxide, more specifically identified as 3,4-8,9-diepoxytricyclo-[5.2.1.0$^{2,6}$]-decane. A suitable polyfunctional cyclic ether is 1,3,5-trioxane.

Glycidyl esters of acrylic acid and of its homologs, methacrylic acid and crotonic acid, are vinyl epoxy monomers of particular interest. Other such monomers are allyl glycidyl ether (1-allyloxy-2,3-epoxypropane) and glycidyl phenyl ether (1,2-epoxy-3-phenoxypropane). Another readily available product is a mixture of ethers of the structure

where R is alkyl, that is, glycidyl alkyl ethers. One such mixture contains predominantly glycidyl octyl ether and decyl glycidyl ether; another contains dodecyl glycidyl ether and glycidyl tetradecyl ether. Epoxidized novolak prepolymers likewise may be used, as well as polyolefin (e.g., polyethylene) epoxides. The latter are exemplified by epoxidized, low molecular weight byproducts of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxy derivatives of alkanes having 11 to 14 carbons, or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexane-carboxylic acid is the deipoxide (3,4-epoxy-cyclohexyl)methyl 3,4-epoxycyclohexanecarboxylate; this same ester may be indexed under the name 7-oxabicyclo[4.1.0]-hept-3-ylmethyl 7-oxabicyclo[4.1.0]heptane-3-carboxylate. Another suitable diepoxide may be obtained as an ester of a substituted (epoxycycloalkyl)methanol and a dibasic acid, for example, bis[3,4-epoxy-6-methylcyclohexyl)methyl] adipate, which may be named alternatively bis-[4-methyl-7-oxabicyclo-[4.1.0]hept-3-yl)methyl] adipate. Diepoxide monomeric materials may be obtained conveniently as bis(epoxyalkyl) ethers of glycols, an example being the diglycidyl ether of 1,4-butanediol, that is, 1,4-bis-(2,3-epoxypropoxy)butane. This diepoxide is related to the diglycidyl ether of bisphenol A, shown above as 2,2-bis-[p-(2,3-epoxypropoxy)-phenyl]propane.

Lactones tend to be readily polymerizable under the action of a cationic catalyst such as a Lewis acid. Lactone monomers suitable for admixture in the compositions of the invention may be any lactone which is polymerizable to higher molecular weights through the action of cationic catalysts. Such lactones are described and claimed in copending U.S. application Ser. No. 292,759, filed Sept. 27, 1972 entitled "Photopolymerization of Lactones." Lactones preferred for use in the instant compositions are cyclic esters, derived from hydroxy acids and represented by the general formula:

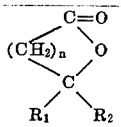

wherein $R_1$ and $R_2$ is hydrogen or alkyl, preferably lower alkyl containing one to six carbon atoms and n, the number of methylene groups, is an integer of 1-13. Such cyclic esters are derived from hydroxy acids containing between three to 15 carbon atoms including the beta, gamma, delta and epsilon forms of propiolactone, butyrolactone, caprolactone, pivalolactone, valerolactone, octanoic lactone, pentadecylic lactone, etc. Especially preferred are B-propiolactone and gammabutyrolactone. Many of such compounds are readily available commercially or their preparation is readily had by methods known in the art, for example, by intramolecular conversion of the corresponding hydroxy acid effected by heating.

Various ethylenically unsaturated materials are likewise suitable for admixture in the present invention. The preferred compounds are vinyl compounds, containing a polymerizable

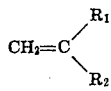

group wherein $R_1$ and $R_2$ may be hydrogen, aryl, alkyl, alkoxy, aryloxy, carbazolyl, etc. Such compounds include styrene, alkyl and halo-substituted styrenes such as α-methyl styrene, α-chlorostyrene, ethyl styrene; o, m and p-alkyl styrenes such as 2,4-dimethyl styrene; metapropyl styrene, dichlorostyrene, bromostyrene, etc.; vinyl ethers such as isobutyl vinyl ether, cetyl vinyl ether, vinyl methyl ether, vinyl ethyl ether, dodecyl vinyl ether, vinyl 2-chloroethyl ether, vinyl 2-ethylhexyl ether, vinyl isopropyl ether, vinyl decyl ether, vinyl 2-ethoxyethyl ether, vinyl methoxymethyl ether, vinyl benzyl ether, vinyl 3-phenylpropyl ether, vinyl 1-cyclohexyl ethyl ether, vinyl phenyl ether, etc.; vinyl carbazoles such as N-vinyl carbazole, etc.

Such polymerizable monomer mixtures will usually contain a predominant proportion of epoxide material. In general, such mixtures will contain from about 0.25 to 98 parts, preferably 10 to 50 parts epoxide per part of lactone or vinyl monomer.

The materials utilized as latent polymerization initiators in the process and compositions of the present invention are radiation-sensitive catalyst precursors which decompose to provide a Lewis acid upon application of energy. The energy required for effective decomposition may be thermal energy, applied simply by heating, or may be energy applied by bombardment with charged particles, notably by high-energy electron beam irradiation. Preferably, however, the catalyst precursors are photosensitive, and the required energy is imparted by actinic irradiation, which is most effective at those regions of the electromagnetic spectrum at which there is high absorption of electromagnetic energy by the particular catalyst precursor used. More than one of these types of energy may be applied to the same system; e.g., ultraviolet light irradiation followed by electron beam irradiation, and post-heating also may be employed, although irradiation ordinarily can effect a suitable cure.

The preferred photosensitive Lewis acid catalyst precursors are automatic diazonium salts of complex halogenides, which decompose upon application of energy to release a halide Lewis acid. The aromatic diazonium cation may be represented generally as $[Ar-N^+ \equiv N]$, where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by $[MX_{n+m}]^{-m}$. Thus, the photosensitive salt and its decomposition upon actinic irradiation may be depicted as follows:

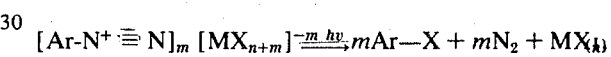

where X as the halogen ligand of the complex halogenide, M is the metallic or metalloid central atom thereof, $m$ is the net charge on the complex halogenide ion, and $n$ is the number of halogen atoms in the halide Lewis acid compound released. The Lewis acid halide MX is an electron pair acceptor, such as $FeCl_3$, $SnCl_4$, $PF_5$, $AsF_5$, $SbF_5$, and $BiCl_3$, which upon suitable irradiation of the diazonium complex salt is released in substantial quantities and initiates or catalyzes the polymerization process, wherein the monomeric or prepolymeric material is polymerized or cured as the result of the actinic irradiation.

The diazonium compounds of the present invention may be prepared using procedures known in the art, and such preparation forms no part of the present invention. Thus, for example, chlorometallic halogenide complexes may be prepared in accordance with the method set forth by Lee et al in *Journal of the American Chemical Society*, 83, 1928 (1961). Exemplifying a procedure of general utility, arenediazonium hexafluorophosphates can be prepared by diazotizing the corresponding aniline with $NOPF_6$, made by combining HCl and $NaNO_2$ with subsequent addition of hydrogen hexafluorophosphate ($HPF_6$) or of a hexafluorophosphate salt, or they can be prepared by addition of a hexafluorophosphate salt to another diazonium salt to effect precipitation. As a further example, various morpholinoaryl complexes, containing the group

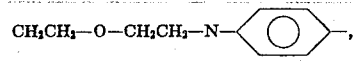

can be prepared either from the aniline derivative or by adding an aqueous solution of a metal salt of the desired complex halogenide to a solution of morpholinobenzenediazonium tetrafluoroborate.

Illustrative of the aromatic diazonium cations comprised in the photosensitive catalyst salts utilized in accordance with the present invention are the following:
p-chlorobenzenediazonium
2,4-dichlorobenzenediazonium
2,5-dichlorobenzenediazonium
2,4,6-trichlorobenzenediazonium
2,4,6-tribromobenzenediazonium
o-nitrobenzenediazonium
p-nitrobenzenediazonium
4-nitro-o-toluenediazonium
   (2-methyl-4-nitrobenzenediazonium)
2-nitro-p-toluenediazonium
   (4-methyl-2-nitrobenzenediazonium)
6-nitro-2,4-xylenediazonium
   (2,4-dimethyl-6-nitrobenzenediazonium)
2-chloro-4-(dimethylamino)-5-methoxybenzenediazonium
4-chloro-2,5-dimethoxybenzenediazonium
2,4',5-triethoxy-4-biphenyldiazonium
   (2,5-diethoxy-4-(p-ethoxyphenyl)benzenediazonium)
2,5-dimethoxy-4'-methyl-4-biphenyldiazonium
   (2,5-dimethoxy-4-(p-tolyl)benzenediazonium
2,5-diethoxy-4-(phenylthio)benzenediazonium
2,5-diethoxy-4-(p-tolylthio)benzenediazonium
p-morpholinobenzenediazonium
2,5-dichloro-4-morpholinobenzenediazonium
2,5-dimethoxy-4-morpholinobenzenediazonium
4-(dimethylamino)-1-naphthalenediazonium Illustrative of the complex halogenide anions comprised in the photosensitive catalyst salts utilized in accordance with the present invention are the following:

tetrachloroferrate(III), $FeCl_4^-$
hexachlorostannate(IV), $SnCl_6^{2-}$
tetrafluoroborate, $BF_4^-$
hexafluorophosphate, $PF_6^-$
hexafluoroarsenate(V), $AsF_6^-$
hexafluoroantimonate(V), $SbF_6^-$
hexachloroantimonate(V), $SbCl_6^-$
pentachlorobismuthate(III), $BiCl_5^{2-}$ A selection of aromatic diazonium salts of complex halogenides is listed in Table I. Many of the salts listed have been found to be well adapted or superior for use as latent photosensitive polymerization initiators in the process and compositions of the present invention, based on thermal stability, on solubility and stability in the epoxy formulations and solvents (if any) used, on photosensitivity, and on ability to effect polymerization with the desired degree of curing after adequate actinic irradiation. Following the name of each aromatic diazonium halogenide is its melting point or decomposition temperature in degrees centigrade, and wavelengths of electromagnetic radiation, in nanometers, at which it exhibits absorption maxima.

TABLE I

|  | M.P., °C. | Abs'n Max., nm. |
|---|---|---|
| 2,4-dichlorobenzenediazonium tetra-chloroferrate(III) | 62–64 | 259, 285, 360 |
| p-nitrobenzenediazonium tetra-chloroferrate(III) | 93–95 | 243, 257, 310, 360 |
| p-morpholinobenzenediazonium tetrachloroferrate(III) | 121.5 | 240, 267, 313, 364 |
| 2,4-dichlorobenzenediazonium hexachlorostannate(IV) | 190 | 285 |
| p-nitrobenzenediazonium hexachlorostannate(IV) | 126 | 258, 310 |
| 2,4-dichlorobenzenediazonium tetrafluoroborate | 152 | 285, 325–340 (shoulder) |
| p-chlorobenzenediazonium hexafluorophosphate | 162–164 | 273 |
| 2,5-dichlorobenzenediazonium hexafluorophosphate | dec. 140 | 264, 318 |
| 2,4,6-trichlorobenzenediazonium hexafluorophosphate | 240–250 | 294, 337 |
| 2,4,6-tribromobenzenediazonium hexafluorophosphate | 245–260 | 306 |
| p-nitrobenzenediazonium hexafluorophosphate | 156 (178) | 258, 310 |
| o-nitrobenzenediazonium hexafluorophosphate | 161.5 |  |
| 4-nitro-o-toluenediazonium hexafluorophosphate | 123 (138) | 262, 319 |
| 2-nitro-p-toluenediazonium hexafluorophosphate | 164–165 | 286 |
| 6-nitro-2,4-xylenediazonium hexafluorophosphate | 150 | 237, 290 |
| p-morpholinobenzenediazonium hexafluorophosphate | 162 (181) | 377 |
| 4-chloro-2,5-dimethoxybenzenediazonium hexafluorophosphate | 168–169 (198–208) | 243 (shoulder) 287, 392 |
| 2,5-dimethoxy-4-morpholinobenzenediazonium hexafluorophosphate | Above 135 | 266, 396 |
| 2-chloro-4-(dimethylamino)-5-methoxybenzenediazonium hexaflurorphosphate | 111 | 273, 405 |
| 2,5-dimethoxy-4-(p-tolylthio)benzenediazonium hexafluorophosphate | 146 (155) | 358, 400 |
| 2,5-diethoxy-4-(p-tolylthio)benzenediazonium hexafluorophosphate | 147 (150) | 223 (shoulder) 247, 357, 397 |
| 2,5-dimethoxy-4'-methyl-4-biphenyldiazonium hexafluorophosphate | 167 | 405 |
| 2,4',5-triethoxy-4-biphenyldiazonium hexafluorophosphate | 136 | 265, 415 |
| 4-(dimethylamino)-1-naphthalenediazonium hexafluorophosphate | 148 | 280, 310, 410 |
| p-nitrobenzenediazonium hexafluoroarsenate(V) | 141–144 (161) | 257, 310 |
| p-morpholinobenzenediazonium hexafluoroarsenate(V) | 162 (176–177) | 257, 378 |
| 2,5-dichlorobenzenediazonium hexafluoroantimonate(V) | 161–162.5 | 238, 358 |
| p-nitrobenzenediazonium hexafluoroantimonate(V) | 140–141 | 257, 308 |
| p-morpholinobenzenediazonium hexafluoroantimonate(V) | 153 (177.5–180.5) | 254, 374 |
| 2,4-dichlorobenzenediazonium hexachloroantimonate(V) | 178–180 | 279, 322 (shoulder) |
| 2,4-dichlorobenzenediazonium pentachlorobismuthate(III) | 193.5–195 | 285, 313 |
| o-nitrobenzenediazonium pentachlorobismuthate(III) | 166.5–168 | 285, 313 |

The melting points given in Table I were determined generally by the usual visual capillary tube method; in most cases discoloration began below the observed melting point temperature with frothing decomposition at that temperature. In some cases melting points or exotherms were determined also by differential thermal analysis under nitrogen gas, and the temperatures so determined are given in parentheses. The wavelengths of absorption maxima in the ultraviolet-to-visible range were determined with the diazonium complex salt dissolved in acetonitrile.

In accordance with the present invention, nitriles are utilized in stabilizing amounts as gelation inhibitors for essentially solventless polymerizable compositions, defined as compositions comprising the polymerizable material, a photosensitive catalyst precursor, and the nitrile wherein the total amount present of nitriles and of any unpolymerizable volatile solvents is less than about 4 percent by weight.

Notable as the nitrile compound is acetonitrile, which may be represented $CH_3O \equiv N$, or more conveniently $CH_3CN$.

Additional examples are:
propionitrile, $CH_3CH_2CN$
butyronitrile, $CH_3(CH_2)_2CN$
isobutyronitrile, $(CH_3)_2CHCN$
adiponitrile, $NC(CH_2)_4CN$
phenylacetonitrile (benzyl cyanide, an aralkyl cyanide),

benzonitrile,

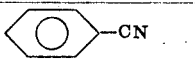

tolunitrile,

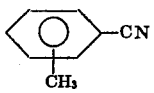

cyclohexanecarbonitrile (hexahydrobenzonitrile, a cycloalkyl cyanide),

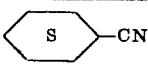

A great variety of nitrile compounds may be utilized as the gelation inhibitors in the compositions of the invention, provided only that the substituents on the cyano, $N \equiv C-$, group form a compound therewith which is substantially inert to the polymerizable material and to the catalyst precursor, these being the components which provide the desired end properties of the polymerizable composition as utilized in the polymerizable process of the invention.

Of course, in confirming the inert character of such a gelation inhibitor, the absence of any substantial deleterious effects on the other constituents of the polymerizable composition need be ascertained only in the presence of the small stabilizing amount of the inhibitor to be used, and over a period of time commensurate with the desired storage or pot life of the composition.

It will be appreciated therefore, that the polymerizable material, the radiation-sensitive catalyst precursor, and the nitrile gelation inhibitor should be compatible with each other in the sense of substantial freedom from mutual chemical attack during storage prior to irradiation. Moreover, the three components also should be compatible in the sense of mutual physical affinity. Thus, it would not be preferable to provide either the gelation inhibitor or the catalyst precursor in the mixture in the form of undissolved solid particles or immiscible liquid globules distributed through the mixture, even though insoluble dispersed materials might perform to some degree their intended functions, respectively, of counter-activity against prematurely formed Lewis acid, and of release of the Lewis acid catalyst upon eventual irradiation.

The catalyst precursors listed hereinabove are solids. Some of the nitrile gelation inhibitor compounds utilized in accordance with the present invention are liquids of substantial volatility; others may be solids at room temperature. While it often is possible to dissolve such ingredients in one or more of the polymerizable ingredients making up the epoxide or other polymerizable material utilized in the composition, it usually is more convenient for mixing purposes to provide these ingredients for the mixing operation already dissolved in a solvent. Thus the use of a small amount of a solvent medium such as acetone or anisole often is convenient for introducing liquid additives miscible in such medium, as well as solid additives. It has been found that commercial propylene carbonate (a cyclic propylene ester of carbonic acid, probably identified as primarily 4-methyl-1,3-dioxolan-2-one) makes a particularly good solvent for the aromatic diazonium complex salts and also for the nitrile compounds, and the propylene carbonate so used is completely miscible with epoxy resins. For example, the propylenecarbonate may make up between approximately 1 and 2½ percent by weight of the entire polymerizable composition.

To avoid substantially the disadvantages of utilizing an inert solvent medium, the total amounts of any solvents which do not participate in the polymerization reactions, including a solvent such as propylene carbonate and any volatile solvents present, should be kept below about 4 percent by weight. In particular, as indicated hereinabove, unpolymerizable volatile solvents (including volatile nitriles) boiling below about 190°C should be kept within this approximate limit of 4 percent by weight to avoid the substantial evolution of waste gases during application and polymerization of the polymerizable composition.

Referring to equation I hereinabove showing the photolytic decomposition of the catalyst precursor, the halide Lewis acid $MX_n$, released reacts with the polymerizable material with a result exemplified by the following:

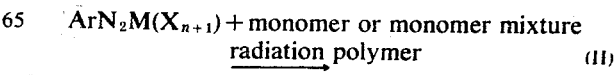

The cationic catalyst is believed to act by cleaving a carbon-oxygen epoxy or lactone bond, or by opening the double bond in a vinyl (ethylenic) monomer, initiating growth of a polymeric chain or permitting formation of a cross-linkage. A general application of the process embodied by equations I and II can be as follows: a diazonium complex salt, for example, as identified hereinabove, is admixed with an epoxy monomer in admixture with a lactone or vinyl monomer and, as stabilizer, with a quantity of a nitrile. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the epoxy monomer or mixture of monomers. The resulting polymer is resistant to most solvents and chemicals.

The source of radiation for carrying out the method of the present invention can be any suitable source, such as the ultraviolet actinic radiation produced from a mercury, xenon, or carbon arc lamp, or the electron beam produced in a suitably evacuated cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorption of energy to excite the desired decomposition.

For an imaging system, the mixture is coated on a metal plate, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of the polymer in this embodiment.

The polymers produced by the polymerizing process of of the present invention are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, offset plates, stencil-making, microimages for printed circuitry, thermoset vesicular images, microimages for information storage, decoration of paper, glass, and packages, and light-cured coatings.

The procedures for mixing the stabilized radiation-sensitive compositions of the present invention using the polymerizable materials, for example, are relatively simple. The monomer or prepolymer resin, or polymerizable mixture thereof, is combined with the catalyst precursor and the nitrile inhibitor. The catalyst precursor thus may be dissolved directly in the polymerizable material, or in a portion of an epoxide having good solvent properties and low viscosity which thereafter is blended with other epoxides to form an epoxide blend suitable for the ultimate utilization of the composition. Alternatively, either the catalyst precursor, or the nitrile compound or compounds, or both of these ingredients may be mixed preliminarily in a small proportion of a volatile or nonvolatile solvent medium, as discussed hereinabove, and then combined with the polymerizable material. In fact, it has been found convenient in preparing some formulations to dissolve the catalyst precursor in the liquid nitrile inhibitor itself, after which the resulting solution is mixed into the polymerizable material.

The amount of catalyst precursor employed should be sufficient to insure complete polymerization. It has been found that quite satisfactory results are obtained by providing a diazonium complex salt in amount by weight from about 0.5 to about 5 percent of the catalyst precursor relative to the weight of the polymerizable material present, about 1 percent or less of the precursor being amply effective with some epoxide-catalyst precursor systems.

The amount of the nitrile compound needed for the desired stabilizing effect is determined readily for given ingredients, using simple tests performed quite readily by the skilled formulator, preferably covering a range of test proportions to determine storage or pot life as a function of inhibitor proportion. A convenient test procedure involves viscometer measurements after storage in the dark for a period as long as the maximum storage life needed for the operations in which the stabilized mixed polymerizable composition is to be used. Most coating and printing operations, for example, can utilize formulations having a viscosity within a substantial predetermined range, and use of the inhibitor can maintain the formulations within the desired viscosity ranges for a much longer period. The viscosity of the freshly prepared mixture, even if solvent-free, is low enough in some cases to permit quite substantial polymerization before the composition becomes too viscous to be usable.

The examples set out hereinbelow will indicate a range of proportions within which the nitrile inhibitor usually is required. It appears that amounts of the inhibitor as little as 0.1 percent, and of the order of 0.2 to 1.5 percent by weight, relative to the weight of the entire polymerizable composition, can be markedly effective in increasing usable pot life. In general, the inhibitor preferably is present in an amount by weight equal to between about 0.05 percent and about 2.5 percent of the weight of the composition. Unnecessarily large amounts of the inhibitor may in some formulations tend to decrease the catalytic potential of the catalyst precursor and with many nitriles the inhibitor itself may be a volatile solvent whose presence in excess of about 4 percent by weight is undesirable for many applications. For these reasons, provision of the inhibitor in excess of suitable stabilizing amounts ordinarily should be avoided.

It may be desirable to include in the composition an inert pigment or filler, which may be present in even a major proportion by weight, or small amounts of inert non-volatile liquids such as mineral oil. Inclusion of such inert ingredients usually makes advisable a proportionate increase in the optimum amount of catalyst precursor used. Nevertheless, the precursor needed rarely exceeds 5 percent of the entire weight of the composition, and an amount of the nitrile gelation inhibitor less than about 2.5 percent of the total weight usually is sufficient.

The following examples will serve further to illustrate the present invention.

EXAMPLE 1

A 40-gram weight of bis[3,4-epoxy-6-methylcyclohexyl)-methyl] adipate was diluted with 40 milliliters of 1,4-butanediol diglycidyl ether and stirred until homogeneous. The solution was divided into two equal parts. To one part was added 0.2 gram of solid p-chlorobenzenediazonium hexafluorophosphate as the catalyst. To the other was added 1 ml (0.78 g) of acetonitrile in which was dissolved 0.2 gram of the p-chlorobenzenediazonium hexafluorophosphate. The two solutions then were suspended in a constant temperature bath at 30°C and their viscosities measured periodically using Ostwald-Cannon-Fenske viscometers.

Within three hours the formulation without acetonitrile had gelled, and its viscosity could no longer be measured. The formulation containing the quantity of acetonitrile, on the other hand, remained fluid for several days. After three days, its viscosity had increased from 24.6 centistokes to 100.4 centistokes.

Numerical values of viscosities are given in Table II.

TABLE II

| | Formulation Without Acetonitrile |
|---|---|
| Age (Minutes) | Viscosity at 30°C (Centistokes) |
| 0 | 34.0 |
| 35 | 64.4 |
| 105 | 269.4 |
| 165 | 600.0 |
| 200 | Gelled |
| 0 | 24.2 |
| 15 | 24.6 |
| 95 | 26.2 |
| 155 | 27.6 |
| 263 | 29.5 |
| 333 | 30.8 |
| 405 | 32.4 |
| 445 | 32.7 |
| 3 days | 100.4 |

EXAMPLE 2

A composition is prepared by mixing the following ingredients:

| | |
|---|---|
| Bisphenol A diglycidyl ether prepolymer | 20 grams |
| 1,4-Butanediol diglycidyl ether | 30 grams |
| Butyl glycidyl ether (1-butoxy-2,3-epoxypropane) | 2 grams |
| p-Chlorobenzenediazonium hexafluorophosphate | 150 milligrams |
| Acetonitrile | 2 grams |

The crosslinking of epoxides is an exothermal reaction, and in cases where the reaction is rapid and heat dissipation poor there is a detectable increase in temperature of the epoxide formulation. In this Example, two identical compositions were prepared with the ingredients set forth above except that in the second composition the acetonitrile was not included.

Changes in temperature of the two compositions on storage were observed and recorded. Results are set forth in Table III. It will be seen that the composition not stabilized with acetonitrile showed a strong exotherm and gelled in less than 2 hours. The composition containing acetonitrile showed no detectable change in temperature over a period of 3 hours.

After 3 hours, a portion of the stabilized formulation was used to coat an aluminum sheet. The sheet was exposed to a 360 watt ultraviolet lamp at a distance of 10 inches for 60 seconds. The liquor hardened to a tough coating on the aluminum. The formulation stabilized with acetonitrile thus was readily usable for preparing a coating after the unstabilized formulation had completely gelled.

TABLE III

Exothermal Crosslinking Reaction of Unstabilized, 100% Reactive Epoxide Formulation Stored at 26°C

| Minutes After Mixing | Temperature, Unstabilized | Temperature, Stabilized with Acetonitrile |
|---|---|---|
| 0 | 26 | 26 |
| 10 | 26 | 26 |
| 20 | 26 | 26 |
| 30 | 27 | 26 |
| 40 | 28.5 | 26 |
| 50 | 30 | 26 |
| 60 | 36 | 26 |
| 70 | 46 | 26 |
| 80 | 56.5 (gelled) | 26 |
| 90 | 66.5 | 26 |
| 100 | 65.5 | 26 |
| 110 | 59.5 | 26 |
| 120 | 53 | 26 |
| 130 | 46 | 26 |
| 140 | 40 | 26 |
| 150 | 33 | 26 |
| 160 | 27.5 | 26 |
| 170 | 26 | 26 |

EXAMPLE 3

To compare the action of acetonitrile as a stabilizer with other solvents for the diazonium complex salt, a master batch of epoxide resins was prepared as follows:

| Resin | Viscosity at 25°C, Centipoises | Epoxy Equiv. Wt. | Weight, Grams |
|---|---|---|---|
| (3,4-Epoxycyclohexyl)-methyl 3,4-epoxycyclohexane-carboxylate | 275 | 139 | 500 |
| 1,2-Epoxy-4-(epoxyethyl)-cyclohexane | 10 | 77 | 1000 |
| Alkyl glycidyl ether in which alkyl groups are predominantly octyl and decyl | 10 | 227 | 500 |

The batch was divided into five parts of 350 grams each. To each part were added 2.1 grams of 2,5-diethoxy-4-(p-tolylthio)-benzenediazonium hexafluorophosphate and a measured amount of solvent (as indicated below) for the diazonium complex. This was followed by stirring for one hour at 23°C. to achieve complete solution of the diazonium complex salt in mixture identified as follows:

| Sample No. | Solvent | Grams of Solvent |
|---|---|---|
| 3A | none | none |
| 3B | acetonitrile | 1.87 |
| 3C | anisole | 4.92 |
| 3D | dimethyl carbonate | 4.15 |
| 3E | methyl benzoate | 6.23 |

The catalyzed formulations then were aged by storing in the dark at 23°C, and the viscosity of each sample was measured periodically using a Brookfield viscomter. The following changes in viscosity were observed during storage:

| Sample No. | Viscosity at 23°C, Cps, After Aging | | | | |
|---|---|---|---|---|---|
| | Upon Mixing | 72 Hrs. | 115 Hrs. | 139 Hrs. | 236 Hrs. |
| 3A | 10.4 | 32.7 | 57.7 | 79.5 | 225 |
| 3B | 10.6 | 16.5 | 21.2 | 26.6 | 80 |
| 3C | 10.8 | 30.0 | 53.8 | 72.6 | 201 |
| 3D | 10.4 | 29.5 | 55.5 | 75.1 | 220 |
| 3E | 10.5 | 31.2 | 55.5 | 76.0 | 212. |

It will be observed that viscosity of the sample containing acetonitrile changed less than viscosities of the other samples.

EXAMPLE 4

A blend of epoxide resins was prepared by mixing two parts by weight of a bisphenol A diglycidyl ether prepolymeric resin (viscosity 5000–6400 cps at 25°C, epoxy equivalent weight 187), 1 part by weight of (3,4-epoxycyclohexyl)methyl 3,4-epoxycyclohexanecarboxylate, and 0.5 part by weight of a mixture of aliphatic glycidyl ethers containing predominantly decyl glycidyl ether and glycidyl octyl ether. From this batch two aliquots of 350 grams each were removed. To the first were added 2.8 g of p-nitrobenzenediazonium tetrafluoroborate. To the second were added 2.8 g of p-nitrobenzenediazonium tetrafluoroborate and 4 milliliters (3.13 g) of acetonitrile. The two samples then were stored in the dark at room temperature. Periodically their viscosities were measured using a Brookfield viscometer. Changes in viscosity were recorded as follows:

| Age of Sample, Hrs. | Viscosity at 25°C. Centipoises | |
|---|---|---|
| | Sample Without Acetonitrile | Sample With Acetonitrile |
| 0 | 409 | 384 |
| 7 | 990 | 495 |
| 24 | 2,560 | 899 |
| 48 | 7,600 | 1,280 |
| 72 | 17,180 | 1,900 |
| 150 | Gelled | 2,090 |
| 170 | — | 2,480 |

EXAMPLE 5

A blend of epoxide materials was prepared as follows:

| Epoxy | Viscosity at 25°C, Cps | Epoxy Equiv. Wt. | Parts by Weight |
|---|---|---|---|
| 1,2-Epoxy-4-(epoxyethyl)-cyclohexane | 10 | 77 | 1860 |
| Epoxidized cresol novolak | | 200 | 1200 |
| Alkyl glycidyl ether in which alkyl groups are predominantly octyl and decyl | 10 | 227 | 180 |

Cresol or phenol novolaks are made, following procedures well known in the phenol-formaldehyde resin art, by a condensation reaction involving formaldehyde and a commercial grade of cresol (or phenol) in excess amounts, yielding liquid or low-fusing thermoplastic products. Such products are available in epoxidized forms, having average molecular weights in the vicinity of 1,000 and epoxy equivalent weights in the vicinity of 200. One such epoxy-cresol novolak resin was used in the epoxide blend specified above, in this instance having an average molecular weight of 540 and an epoxy equivalent weight of about 200.

Two 600 gram aliquots of the above blend were weighed out. To one were added 3.6 g of p-chlorobenzene-diazonium hexafluorophosphate. To the other were added 3.6 g of p-chlorobenzenediazonium hexafluorophosphate and 6.5 g of acetonitrile. Within 60 minutes following addition of the diazonium salt, the formulation without acetonitrile underwent a rapid increase in temperature, causing boiling of the formulation and vaporization of some of the low-molecular-weight resins, and finally gelled into a fused mass. The formulation containing acetonitrile remained cool and free-flowing during this same period; during the next 24 hours its viscosity increased from 85 to 918 centipoises.

EXAMPLE 6

Five aliquots weighing 550 grams each were taken from the resin blend shown in Example 5. To each part were added a weighed amount of solvent, as shown below, and 3.5 grams of 2,5-diethoxy-4-(p-tolylthio) benzenediazonium hexafluorophosphate.

| Sample No. | Solvent Added | Weight of Solvent, Gms |
|---|---|---|
| 6A | None | — |
| 6B | Acetonitrile | 6.5 |
| 6C | Anisole | 17.1 |
| 6D | Dimethyl carbonate | 21.5 |
| 6E | Methyl benzoate | 14.2 |

The catalyzed formulations were stored in the dark at 25°C, and the viscosity of each sample was determined periodically by means of a Brookfield viscometer. Viscosity changed with aging, as shown in the following compilation:

| Age of Samples (Hours) | Viscosity at 25°C. Centipoises | | | | |
|---|---|---|---|---|---|
| | Sample 6A | Sample 6B | Sample 6C | Sample 6D | Sample 6E |
| 0 | 61 | 53 | 50 | 44 | 53 |
| 26 | 66 | 56 | 54 | 47 | 56 |
| 50 | 151 | 64 | 114 | 108 | 141 |
| 75 | 380 | 75 | 284 | 262 | 427 |
| 99 | 793 | 88 | 559 | 569 | 827 |
| 170 | Gelled | 150 | Gelled | Gelled | Gelled |

These data indicate that the relatively small proportion of the acetonitrile, making up 1.16 percent of the weight of Sample 6B, was effective to limit increase in viscosity over a period of a week, while the samples with the other solvent materials gelled about as quickly as the solvent-free Sample 6A.

EXAMPLE 7

Formulations were prepared consisting of 50 parts of (3,4-epoxycyclohexyl)methyl 3,4-epoxycyclohexanecarboxylate, 50 parts of the diglycidyl ether of 1,4-butanediol, 2 parts of p-chlorobenzenediazonium hexafluorophosphate, and various amounts of acetonitrile, as shown below. The formulations were stored in closed containers in the absence of ultraviolet radiation at 25°C. The time required for these formulations to gel was measured.

| Sample No. | Acetonitrile (Parts per 100 by Weight) | Gel Time (Hours) |
|---|---|---|
| 7A | None | Less than 20 |
| 7B | 0.31 | 48 |
| 7C | 0.62 | 72 |
| 7D | 0.93 | 96 |
| 7E | 2.29 | 144 |

It appears from the above data that the gelling time of these formulations continues to increase quite steadily as the amount of acetonitrile is increased up to the vicinity of at least 1.5 percent of formulation weight, while proportions greater than those in the vicinity of 2.2 to 2.5 percent would provide relatively small additional improvements in stability and pot life.

EXAMPLE 8

A resin batch was prepared by mixing together the following epoxides in the indicated proportions:

| Epoxide | Epoxy Equiv. Wt. | 25°C Viscosity, Cps. | Parts by Weight |
|---|---|---|---|
| Diglycidyl ether of bisphenol A | 172–178 | 4000–6000 | 20 (60.6%) |
| (3,4-Epoxycyclohexyl)-methyl 3,4-epoxycyclohexanecarboxylate | 131–143 | 350–450 | 10 (30.3%) |
| Alkyl glycidyl ether in which alkyl groups are predominantly dodecyl and tetradecyl | 286 | 8.5 | 3 (9.1%) |
| AND | | | |

A number of 400 gram samples were withdrawn from the batch prepared as shown above, each sample containing very nearly 242 g, 121 g, and 36.4 g respectively of the epoxide ingredients listed. To one sample (Sample 8A) were added 8.0 ml (9.65 g) of propylene carbonate containing 2.8 g of p-chlorobenzenediazonium hexafluorophosphate. To another sample (Sample 8B) were added 0.5 ml (0.39 g, making up 0.095 percent of the total weight of the formulation) of acetonitrile dissolved in 7.5 ml (9.04 g) of propylene carbonate also containing 2.8 g of the same diazonium salt. To a third sample (Sample 8C) were added 1.0 ml (0.78 g, or 0.19 percent) of acetonitrile dissolved in 7.0 ml (8.44 g) of propylene carbonate containing the same amount of the diazonium salt. To a fourth sample (Sample 8D) were added 4.0 ml (3.13 g, or 0.76 percent) of acetonitrile dissolved in 4.0 ml (4.82 g) of propylene carbonate containing the same amount of the diazonium salt.

The four samples, prepared as above, were placed in a constant temperature bath maintained at a temperature of 35°C (95°F), somewhat elevated above normal room temperature. Viscosities of the samples were measured periodically, using a Brookfield viscometer, with the results summarized below:

These results indicate that proportions of the nitrile below 1 percent by weight, and indeed as low as 0.1 percent, can be effective for from one day to several days or more in inhibiting gelation, retaining the resin mix already containing the catalyst precursor in tractable liquid condition.

The following examples illustrate the utilization as gelation inhibitors of various nitrile compounds referred to hereinbelow. Following conventional usage, hydrocyanic acid is not regarded as a nitrile, although it may be named alternatively as formonitrile, and in any event it is not suited for use as a gelation inhibitor. The alkanenitriles, notably those selected from the group consisting of acetonitrile, propionitrile, butyronitrile, and isobutyronitrile, are well suited for use as the inhibitor; the lower alkanenitriles are readily available and particularly appropriate for such use. Alkanedinitriles are difunctional with respect to the nitrile or cyano group, and tests with, for example, adiponitrile indicate the particular effectiveness of such dinitriles. Nitriles in which the substituent on the cyano group is aryl or alkaryl, as represented by the group of nitriles consisting of benzonitrile and tolunitrile, also are effective. A commercial tolunitrile was tested, containing a mixture of the o-, m-, and p-methyl isomers.

EXAMPLE 9

A large batch was prepared of an epoxide mixture quite similar to that used in Example 8, except that the diglycidyl ether of bisphenol A, the diepoxy ester — (3,4-epoxycyclohexyl)methyl 3,4-epoxycyclohexanecarboxylate, — and the alkyl glycidyl ether were specified to have epoxy equivalent weights of 172, 127, and 286 respectively.

A number of 350 gram samples were withdrawn from this batch, each sample thus containing very nearly 212 g, 106 g, and 31.8 g respectively of the above-mentioned three epoxide ingredients. To each of the samples there were added 4 ml (4.82 g) of propylene carbonate. Sample 9A had 2.45 g of p-chlorobenzenediazonium hexafluorophosphate dissolved in the propylene carbonate. The remaining samples included additionally, also mixed with the same amount of propylene carbonate likewise containing the diazonium salt, a weight of a nitrile equal to 0.0259 mole. Thus Sample 9B contained 1.79 g (0.50 percent) of isobutyronitrile, Sample 9C 1.06 g (0.39 percent) of acetonitrile, Sample 9D 1.43 g (0.40 percent) of propionitrile, Sample 9E 1.79 g (0.50 percent) of butyronitrile, and Sample 9F 2.68 g (0.74 percent) of benzonitrile.

After mixing, these six samples were stored at room temperature in the absence of light, and viscosities were measured periodically, using a Brookfield viscometer, with the following results:

| Sample No. | Viscosity at 35°C, Cps, After Aging | | | | | | | |
|---|---|---|---|---|---|---|---|---|
| | 5 Mins. | 3 Hrs. | 22 Hrs. | 46 Hrs. | 70 Hrs. | 142 Hrs. | 166 Hrs. | 190 Hrs. |
| 8A | 280 | 1345 | Gelled | — | — | — | — | — |
| 8B | — | 449 | 918 | 3690 | 14050 | Gelled | — | — |
| 8C | — | 378 | 780 | 1922 | 4650 | Gelled | — | — |
| 8D | — | 280 | 523 | 837 | 1332 | 3525 | 3860 | 4200 |

| Sample No. | Nitrile Added | Viscosity at 23°C, Cps, During Aging | | | | |
|---|---|---|---|---|---|---|
| | | 1 Hr. | 24 Hrs. | 48 Hrs. | 72 Hrs. | 96 Hrs. |
| 9A | None | 905 | 3340 | 11,020 | 66,300 | Gelled |
| 9B | Isobutyro- | 700 | 1050 | 1,430 | 1,820 | 2,880 |
| 9C | Aceto- | 800 | 1050 | 1,360 | 1,565 | 1,595 |
| 9D | Propio- | 825 | 1010 | 1,530 | 1,820 | 2,530 |
| 9E | Butyro- | 825 | 1010 | 1,565 | 1,800 | 2,660 |
| 9F | Benzo- | 860 | 1375 | 1,900 | 2,285 | 3,610 |

Six days after sample 9A had gelled to a solid mass, the five other samples containing nitrile compounds remained fluid, although the viscosity of samples 9B, 9D, 9E, and 9F now had about reached or exceeded 4,000 centipoises. A portion taken from each of the samples 9B, 9C, 9D, 9E, and 9F was coated at that time on paperboard, using a drawbar to provide a coating of the order of 0.0005 inch thick when dry. After exposure for 10 seconds to a 360-watt high pressure mercury lamp at a distance of 3 inches, each of the five coated films was found to have dried to a tough, solid finish. These tests indicated that the presence of the nitrile compounds did not interfere with activation of the catalyst precursor, using the energy provided by ultraviolet light irradiation to effect polymerization and obtain complete curing of the coatings.

EXAMPLE 10

Three 40 gram samples were withdrawn from the large batch of blended epoxides prepared as described in Example 9. To each sample was added a solution of 4 g of p-chlorobenzenediazonium hexafluorophosphate dissolved in 8 ml (9.65 g) of propylene carbonate. Sample 10A contained no gelation inhibitor. Sample 10B contained additionally 1.0 g (0.24 percent) of tolunitrile, while Sample 10C contained instead 1.0 g of adiponitrile. The samples were stored in the dark at room temperature, and viscosities were measured periodically with the following results:

| Sample No. | Inhibitor Added | Viscosity at 23°C, Cps, During Aging | | | | |
|---|---|---|---|---|---|---|
| | | 1 Hr. | 24 Hrs. | 48 Hrs. | 72 Hrs. | 200 Hrs. |
| 10A | None | 885 | 1343 | — | Gelled | — |
| 10B | Tolunitrile | 643 | 2228 | 3020 | 3692 | 18,770 |
| 10C | Adiponitrile | 608 | 1270 | 1431 | 1534 | 4,425 |

EXAMPLE 11

Several large batches were prepared by mixing together the following epoxides in the indicated proportions:

| Epoxide | Equiv. Wt. | 25°C. Viscosity, Cps. | Parts By Weight |
|---|---|---|---|
| Diglycidyl ether of bisphenol A | 172–178 | 4000–6000 | 55 |
| (3,4-Epoxycyclohexyl)-methyl 3,4-epoxycyclohexanecarboxylate | 131–143 | 350–450 | 30 |
| Alkyl glycidyl ether in which alkyl groups are predominantly dodecyl and tetradecyl | 286 | 8.5 | 15 |

A number of 50 gram samples were withdrawn from these batches. To each such sample was added 1.10 g. of propylene carbonate, containing dissolved therein 0.55 g. of 4-chlorobenzene diazonium hexafluorophosphate as the catalyst precursor. Viscosity measurements were made at 25°C., unless otherwise indicated, employing a Brookfield viscometer.

(a) A 10 g. aliquot of a mixture containing 50 g. of the epoxide blend described above, 5.0 g. styrene, 0.55 g. 4-chlorobenzene diazonium hexafluorophosphate and 1.10 g. propylene carbonate was found to have an initial viscosity of 98 centipoises. After 20 hours, the viscosity had increased to 1870 centipoises.

(b) Another 10 g. aliquot of the composition of (a) above but to which 0.02 g. acetonitrile had been added was found to have a viscosity of 1090 centipoises after the 20 hour period.

EXAMPLE 12

(a) A 10 g. aliquot of a mixture containing 50 g. of the epoxide blend of Example 11, 5.0 g. gammabutyrolactone, 0.55 g. 4-chlorobenzene diazonium hexafluorophosphate and 1.10 g. propylene carbonate was stored at 0°C for 16 hours. The initial viscosity measured at 25°C was found to be 133 centipoises. After standing at room temperature for an additional 2 hours, the viscosity increased to 2420 centipoises.

(b) Another 10 g. aliquot of the same composition as in (a) above but to which 0.02 g. acetonitrile had been added was found to have a viscosity of 127 centipoises at 25°C after standing for 16 hours at 0°C. After standing for 2 additional hours at room temperature, the viscosity was found to be 275 centipoises.

EXAMPLE 13

(a) A 10 g. aliquot of a mixture containing 50 g. of the epoxide blend described in Example 11, 1.5 g. dodecyl vinyl ether, 0.52 g. 4-chlorobenzene diazonium hexafluorophosphate and 1.04 g. propylene carbonate was found to gel to a solid state within 45 minutes.

(b) Another 10 g. aliquot of the same composition as in (a) above but to which 0.02 g. acetonitrile had been added was found to reach the gel stage in 2 hours.

While there have been described particular embodiments of the invention, including those at present considered to be the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A stabilized polymerizable composition, comprising a polymerizable material consisting essentially of:

a monomeric or prepolymeric epoxide or mixture thereof in admixture with a monomer selected from the group consisting of lactones and vinyl-containing compounds having the general formula:

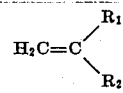

wherein $R_1$ are $R_2$ are hydrogen, alkyl, alkoxy, aryl, aryloxy, halogen, haloalkyl, haloaryl and carbazolyl, said mixture being polymerizable to higher molecular weights through the action of a cationic catalyst;

a radiation-sensitive catalyst precursor which decomposes upon application of energy to provide a Lewis acid effective to initiate polymerization of said polymerizable material, said precursor being an aromatic diazonium salt of a complex halogenide, and a stabilizing amount of a gelation inhibitor, in the form of a nitrile selected from the group consisting of alkane dinitriles and alkyl, aryl, aralkyl, alkaryl and cycloalkyl nitriles, for counteracting prematurely formed Lewis acid, said stabilizing amount of the nitrile inhibitor being substantially inert to said polymerizable material and said catalyst precursor, and the total amount present in said composition of nitriles and of any unpolymerizable volatile solvents together being less than about 4 percent by weight of the composition.

2. The composition of claim 1, in which the monomeric or prepolymeric epoxide is a mixture of epoxides.

3. The composition of claim 1, in which the polymerizable material is a mixture of epoxides and a lactone.

4. The composition of claim 3, in which said lactone is gamma-butyro-lactone.

5. The composition of claim 1, in which the polymerizable material is a mixture of epoxides and a vinyl-containing compound.

6. The composition of claim 5, in which said vinyl-containing compound is styrene.

7. The composition of claim 5, in which said vinyl-containing compound is dodecyl vinyl ether.

8. The composition of claim 1, in which said catalyst precursor is present in an amount equal to between about 0.5 and about 5 percent of the weight of said polymerizable material present in the composition.

9. The composition of claim 1, in which said gelation inhibitor is an alkanenitrile.

10. The composition of claim 9, in which said alkanenitrile is selected from the group consisting of acetonitrile, propionitrile, butyronitrile, and isobutyronitrile.

11. The composition of claim 1, in which said gelation inhibitor is an acetonitrile.

12. The composition of claim 1, in which said gelation inhibitor is an alkanedinitrile.

13. The composition of claim 1, in which said gelation inhibitor is adiponitrile.

14. The composition of claim 1, in which said gelation inhibitor is selected from the group consisting of benzonitrile and tolunitrile.

15. The composition of claim 1, in which said nitrile gelation inhibitor is present in an amount by weight equal to between about 0.05 and about 2.5 percent of the weight of the composition.

16. A stabilized polymerizable composition comprising a polymerizable material consisting essentially of:
a liquid monomeric or prepolymeric epoxide material or mixture or epoxide materials with a monomer selected from the group consisting of gamma butyrolactone, styrene and dodecyl vinyl ether, said mixture being polymerizable to higher molecular weights through the action of a cationic catalyst;
an aromatic diazonium salt of a complex halogenide which decomposes upon application of energy to provide a halide Lewis acid effective to initiate polymerization of said epoxide material, said salt being present in an amount equal to between about 0.5 and about 5 percent of the weight of said epoxide material present in said composition;
and a gelation inhibitor, for counteracting prematurely formed Lewis acid, in the form of a nitrile selected from the group consisting of alkanenitriles, alkanedinitriles, benzonitrile, and tolunitrile, said nitrile being present in an amount by weight equal to between about 0.05 and about 2.5 percent of the weight of said composition, and the total amount present in said composition of said nitrile and of any unpolymerizable volatile solvents together being less than about 4 percent by weight of the composition.

17. The composition of claim 16, in which said nitrile is acetonitrile.

18. The composition of claim 16, in which the polymerizable material is a mixture of epoxides and gammabutyrolactone.

19. The composition of claim 16, in which the polymerizable material is a mixture of epoxides and styrene.

20. The composition of claim 16, in which the polymerizable material is a mixture of epoxides and dodecyl vinyl ether.

21. The process of polymerizing a polymerizable material consisting essentially of monomeric or prepolymeric epoxides or mixtures thereof in admixture with a monomer selected from the group consisting of lactones and vinyl-containing compounds having the general formula:

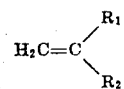

wherein $R_1$ and $R_2$ are hydrogen, alkyl, alkoxy, aryl, aryloxy, halogen, haloalkyl, haloaryl and carbazolyl,
said mixture being polymerizable to higher molecular weights through the action of a cationic catalyst, comprising:
forming a mixture of the polymerizable material with a radiation-sensitive catalyst precursor with decomposes upon application of energy to provide a Lewis acid effective to initiate polymerization of said polymerizable material, said precursor being an aromatic diazonium salt of a complex halogenide, and also a stabilizing amount of a gelation inhibitor in the form of a nitrile compound selected from the group consisting of alkane dinitriles and alkyl, aryl, aralkyl, alkaryl and cycloalkyl nitriles, for counteracting prematurely formed Lewis acid, said stabilizing amount of the nitrile inhibitor being substantially inert to said polyermizable material and to said catalyst precursor, and the total amount present in the resulting mixture of nitriles and of any unpolymerizable volatile solvents together being less than about 4 percent by weight of the mixture;
and subsequently applying energy to the resulting mixture to release said Lewis acid in sufficient amounts to effect substantial polymerization of the polymerizable material.

22. The process of claim 21, in which the monomeric or prepolymeric epoxide is a mixture of epoxides.

23. The process of claim 21, in which the polymerizable material is a mixture of epoxides and a lactone.

24. The process of claim 21, in which the polymerizable material is a mixture of epoxides and a vinyl-containing compound.

25. The process of claim 21, in which said catalyst precursor is mixed with said polymerizable material in an amount equal to between about 0.5 and about 5 percent of the weight of the polymerizable material.

26. The process of claim 21, in which said gelation inhibitor mixed with the polymerizable material and the catalyst precursor is an alkanenitrile.

27. The process of claim 26, in which said alkanenitrile is selected from the group consisting of acetonitrile, propionitrile, butyronitrile, and isobutyronitrile.

28. The process of claim 21, in which said gelation inhibitor mixed with the polymerizable material and the catalyst precursor is acetonitrile.

29. The process of claim 21, in which said gelation inhibitor mixed with the polymerizable material and the catalyst precursor is an alkanedinitrile.

30. The process of claim 29, in which said alkanedinitrile is adiponitrile.

31. The process of claim 21, in which said gelation inhibitor mixed with the polymerizable material and the catalyst precursor is selected from the group consisting of benzonitrile and tolunitrile.

32. The process of claim 21, in which said gelation inhibitor is mixed with said polymerizable material and said catalyst precursor in an amount equal to between about 0.05 and about 2.5 percent of the weight of the resulting mixture.

* * * * *